United States Patent
Melo et al.

(10) Patent No.: US 10,789,625 B2
(45) Date of Patent: Sep. 29, 2020

(54) MARKETING MANAGEMENT SYSTEM

(71) Applicant: ADP, LLC, Roseland, NJ (US)

(72) Inventors: Jason F. Melo, Hastings-on-Hudson, NY (US); Daniel Daehyun Kim, Plainview, NY (US); Siobhan Loughman Sabino, Manalapan, NJ (US)

(73) Assignee: ADP, LLC, Roseland, NJ (US)

( * ) Notice: Subject to any disclaimer, the term of this patent is extended or adjusted under 35 U.S.C. 154(b) by 653 days.

(21) Appl. No.: 15/071,471

(22) Filed: Mar. 16, 2016

(65) Prior Publication Data

US 2017/0270571 A1    Sep. 21, 2017

(51) Int. Cl.
  *G06Q 30/00* (2012.01)
  *G06Q 30/02* (2012.01)
  *G06Q 50/00* (2012.01)
  *G06Q 30/06* (2012.01)

(52) U.S. Cl.
  CPC ..... *G06Q 30/0277* (2013.01); *G06Q 30/0631* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 4,479,196 A | 10/1984 | Ferrer et al. | |
| 6,330,554 B1 | 12/2001 | Altschuler et al. | |
| 7,558,769 B2 | 7/2009 | Scott et al. | |
| 8,312,056 B1* | 11/2012 | Peng | G06Q 50/01 705/319 |
| 8,326,681 B2 | 12/2012 | Di Mario | |
| 8,655,989 B2 | 2/2014 | Ritter et al. | |
| 9,183,307 B2 | 11/2015 | He et al. | |
| 2002/0091568 A1* | 7/2002 | Kraft | G06Q 30/02 705/14.58 |
| 2007/0203713 A1 | 8/2007 | Habichler et al. | |

(Continued)

FOREIGN PATENT DOCUMENTS

WO    2014070555 A1    5/2014

OTHER PUBLICATIONS

PeopleMaps, 7 Degrees Unveils PeopleMaps New Social Business Application, Oct. 20, 2009, Associated Press (Year: 2009).*

(Continued)

*Primary Examiner* — Michael W Schmucker
(74) *Attorney, Agent, or Firm* — Yee & Associates, P.C.

(57) ABSTRACT

A method and apparatus for influencing a potential customer to purchase an item. The item for targeted marketing is identified. The potential customer in a social network for the item is identified. An influencer that has an influence on the potential customer with respect to the item is identified using a hypergraph comprising objects representing people in the social network; edges connecting the object nodes for the people based on relationships between the people; and influence edges representing opinion influences on opinions about items, wherein the influence edges connect the edges to identify opinion influences between the people. An incentive directed to the influencer to influence the potential customer to purchase the item is generated. A display of the incentive in an application running on the client device for the influencer is initiated.

21 Claims, 8 Drawing Sheets

(56) References Cited

U.S. PATENT DOCUMENTS

| | | | |
|---|---|---|---|
| 2009/0276296 A1 | 11/2009 | Spriegel | |
| 2010/0049770 A1* | 2/2010 | Ismalon | G06F 17/30646 |
| | | | 707/765 |
| 2013/0006738 A1* | 1/2013 | Horvitz | G06Q 30/0207 |
| | | | 705/14.16 |
| 2013/0080225 A1* | 3/2013 | Rajaram | G06Q 50/01 |
| | | | 705/14.16 |
| 2013/0097184 A1 | 4/2013 | Berkhin et al. | |
| 2014/0129420 A1* | 5/2014 | Howe | G06Q 40/02 |
| | | | 705/38 |
| 2015/0019474 A1* | 1/2015 | Barbieri | G06Q 30/0201 |
| | | | 706/53 |
| 2015/0089409 A1* | 3/2015 | Asseily | G06Q 10/10 |
| | | | 715/765 |
| 2015/0379113 A1 | 12/2015 | Wang et al. | |
| 2016/0071162 A1* | 3/2016 | Ogawa | G06Q 30/0269 |
| | | | 705/14.66 |
| 2017/0139920 A1 | 5/2017 | Ball et al. | |
| 2017/0270443 A1 | 9/2017 | Melo et al. | |
| 2017/0270588 A1 | 9/2017 | Melo et al. | |

OTHER PUBLICATIONS

Office Action, dated Sep. 5, 2018, regarding U.S. Appl. No. 15/071,453, 38 pages.

Colucci et al., "Knowledge Based Approach to Semantic Composition of Teams in an Organization," ACM Symposium on Applied Computing, Mar. 2005, pp. 1314-1319.

Melo et al., Contextual Skill Management Using a Hypergraph, U.S. Appl. No. 15/071,432, filed Mar. 16, 2016, 61 pages.

Melo et al., Review Management System, U.S. Appl. No. 15/071,453, filed Mar. 16, 2016, 58 pages.

\* cited by examiner

MARKETING MANAGEMENT SYSTEM

CROSS-REFERENCE TO RELATED APPLICATIONS

This application is related to the following patent applications: entitled "Contextual Skill Management Using a Hypergraph", US Patent Application Publication No. 2017/0270443 A1; and entitled "Review Management System", US Patent Application Publication No. 2017/0270577 A1, now US Patent No. 10,552,889; filed even date hereof and assigned to the same assignee. Each of the aforementioned applications is incorporated herein by reference in its entirety.

BACKGROUND INFORMATION

1. Field

The present disclosure relates generally to an improved computer system and, in particular, to a method and apparatus for marketing items. Still more particularly, the present disclosure relates to a method and apparatus for providing incentives in advertisements for an item based on influences by people on a potential customer.

2. Background

The Internet is a global system of interconnected computer networks that link computers and other data processing systems worldwide. The connections are made through an array of electronic, wireless, and optical networking technologies. The Internet provides an extensive range of information and services.

The Internet is used to perform a variety of activities. For example, users employ the Internet to read articles, watch news reports, listen to music, send messages, perform research, play online games, perform banking, purchase products and services, pay bills, talk to other people using voice communications, and perform other activities over the Internet.

For example, users may access information in documents or in other forms on the World Wide Web. The World Wide Web, which is also referred to just as the Web, is an open source information space accessed through the Internet. Users typically access web pages. Web pages are primarily text documents that are formatted in a markup language, such as hypertext markup language (HTML). In addition to the formatted text, the web pages may also include images, video, software components, or other elements that are presented through a web browser. The presentation may be a display of information, an audio presentation, a multimedia presentation, or some combination thereof.

An organization, such as a company, a partnership, a charity, an educational group, a social group, a team, a city, a government agency, or some other suitable organization, may establish a presence on the Web using a website. Some organizations may perform various transactions using a website. For example, a business may offer goods or services to users through a website.

With the vast number of businesses that offer goods or services over the Web, identifying which businesses have good customer service, are reputable, or have other characteristics that are desirable in making purchases may be harder to identify than desired.

These different businesses often advertise over various types of media. For example, many businesses use online advertising. Online advertising includes e-mail marketing, search engine marketing, social media marketing, mobile advertising, and other various types of display advertising on web browsers. Advertisements may be integrated into content in web pages requested by users. These advertisements may be in the form of banners, floating ads, newsfeed ads, and other types of advertisements that users may view while online on the Internet.

With all of the frequency of the different types of advertisements, users may ignore these online ads. Therefore, it would be desirable to have a method and apparatus that take into account at least some of the issues discussed above, as well as other possible issues. For example, it would be desirable to have a method and apparatus that overcome a technical problem with marketing items to potential customers.

SUMMARY

An embodiment of the present disclosure provides an advertisement system. The advertisement system comprises a hypergraph and a marketing manager. The hypergraph comprises objects representing people in a social network. Further, the hypergraph comprises edges for the people based on relationships between the people. Yet further, the hypergraph comprises influence edges for opinion influences on opinions about items, wherein the influence edges connect the edges to identify opinion influences between the people. The marketing manager identifies an item for targeted marketing. Further, the marketing manager identifies a potential customer in a social network for the item. Yet further, the marketing manager identifies an influencer that has an influence on the potential customer with respect to the item using the hypergraph. Still further, the marketing manager generates an incentive to the influencer to influence the potential customer to purchase the item. Still yet further, the marketing manager initiates a display of the incentive in an application running on a client device for the influencer.

Another embodiment of the present disclosure provides a method for influencing a potential customer to purchase an item. The method comprises identifying, by a computer system, the item for targeted marketing. Further, the method comprises identifying, by the computer system, the potential customer in a social network for the item. Yet further, the method comprises identifying, by the computer system, an influencer that has an influence on the potential customer with respect to the item, wherein the influencer is identified using a hypergraph comprising objects representing people in the social network; edges connecting the object nodes for the people based on relationships between the people; and influence edges representing opinion influences on opinions about items, wherein the influence edges connect the edges to identify opinion influences between the people. Still further, the method comprises generating, by the computer system, an incentive directed to the influencer to influence the potential customer to purchase the item. Still yet further, the method comprises initiating, by the computer system, a display of the incentive in an application running on the client device for the potential customer.

Yet another embodiment of the present disclosure provides a computer program product for managing advertisements. The computer program product comprises a computer readable storage media. Further, the computer program product comprises first program code, stored on the computer readable storage media, for identifying an item for targeted marketing. Yet further, the computer program product comprises second program code, stored on the computer readable storage media, for identifying a potential customer in a social network for the item. Still further, the computer program product comprises third program code, stored on the computer readable storage media, for identifying an influencer that has an influence on the potential customer with respect to the item, wherein the influencer is identified using a hypergraph comprising objects representing people in the social network; edges representing edges connecting the objects for the people based on relationships between the people; and influence edges for opinion influences on opinions about items, wherein the influence edges connect the edges to identify opinion influences between the people. Still yet further, the computer program product comprises fourth program code, stored on the computer readable storage media, for generating an incentive directed to the influencer to influence the potential customer to purchase the item. Still further, the computer program product comprises fifth program code, stored on the computer readable storage media, for initiating a display of the incentive in an application running on a client device for the influencer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current mechanisms for displaying advertisements to online users may not be as effective as desired at causing online users to purchase items.

For example, some advertising engines may distribute advertisements for items for display. These items may be goods or services in social networks. These advertisements may include indications that friends of a potential customer on the social network have "liked" a particular item.

The illustrative embodiments recognize and take into account, however, that although a friend of the potential customer in a social network may have indicated a "like" for a particular item, the potential customer may not be influenced by the friend who "liked" the item. Thus, the advertisement may not provide a desired amount of influence for marketing the item to the potential customer.

Thus, the illustrative embodiments provide a method and apparatus for marketing an item to a potential customer. In one illustrative example, an item for targeted marketing is identified. The process also identifies a potential customer in a social network for the item. The process also identifies an influencer in the social network having an influence on the potential customer with respect to the item. The influencers are identified by using a hypergraph comprising object nodes representing people in a social network; edge nodes representing edges connecting the object nodes for the people based on relationships between the people; and influence nodes representing associations between the edges in which the associations are for opinion influences on opinions about items. An incentive is directed to the influencer. The incentive is for the influencer to influence the customer to purchase the item. A display of the incentive is initiated in an application running on a client device for the influencer.

Figure 1:
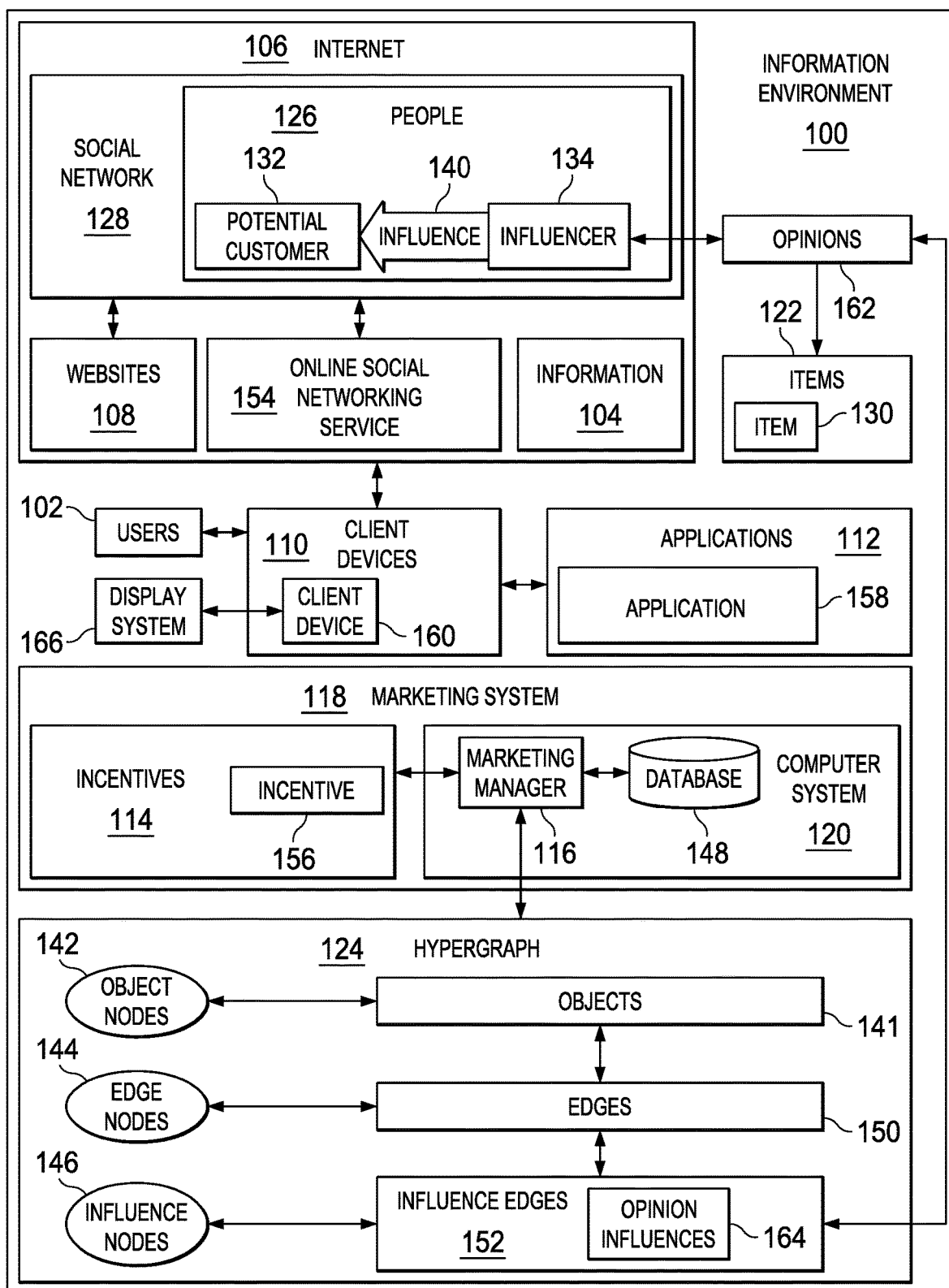
FIG. 1 is a block diagram of an information environment in accordance with an illustrative embodiment.

With reference now to the figures and, in particular, with reference to FIG. 1, a block diagram of an information environment is depicted in accordance with an illustrative embodiment. In this depicted example, information environment 100 includes users 102 who may access information 104 on Internet 106. For example, users 102 may access information 104 on websites 108 on Internet 106.

As depicted, users 102 may access information 104 through client devices 110 operated by users 102. In this illustrative example, information 104 may be requested and received by applications 112 running on client devices 110. In these illustrative examples, an application in applications 112 may be, for example, a browser, a mobile application, or some other suitable type of application that is configured to search for or request information 104. The application may be a social media application.

In these illustrative examples, information 104 may include incentives 114. When included in information 104 received by client devices 110, incentives 114 are displayed by applications 112 on client devices 110.

As depicted, incentives 114 are managed by marketing manager 116 in marketing system 118. Incentives 114 are incentives for items 122. For example, incentives 114 are incentives that influence others to purchase items 122.

Marketing manager 116 may be implemented in software, hardware, firmware, or a combination thereof. When software is used, the operations performed by marketing manager 116 may be implemented in program code configured to run on hardware, such as a processor unit. When firmware is used, the operations performed by marketing manager 116 may be implemented in program code and data and stored in persistent memory to run on a processor unit. When hardware is employed, the hardware may include circuits that operate to perform the operations in marketing manager 116.

In this example, an item in items 122 is selected from one of a product, a service, an entity, a person, an organization, a company, a partnership, a charity, an educational group, a social group, a team, a city, a government agency, a theme park, a restaurant, or some other suitable item.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

As used herein, "a number of", when used with reference to items, means one or more items. For example, "a number of operations" is one or more operations. The number of influencers is identified using the hypergraph.

As depicted, marketing manager 116 is located in computer system 120. Computer system 120 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, marketing manager 116 manages incentives 114 using hypergraph 124. Hypergraph 124 represents people 126 in social network 128. Information 104 is also in social network 128.

Social network 128 is located on Internet 106. Social network 128 is a social structure comprised of individuals or organizations. Social network 128 may be stored and organized by online social networking service 154. In the illustrative examples, social network 128 may be accessed by users 102 and people 126 through online social networking service 154. For example, users 102 and people 126 may use client devices 110 that communicate with online social networking service 154 to access information 104 in social network 128.

Online social networking service 154 is a computer system and may have different purposes, such as connecting people with similar interests, activities, backgrounds, real-life connections, professional interests, or other suitable things that connect people to each other. Examples of online social networking service 154 include Facebook, LinkedIn, Instagram, Twitter, and other types of online social networking services accessed over the Internet.

Marketing manager 116 identifies item 130 for targeted marketing. Marketing manager 116 identifies potential customer 132 in social network 128 for item 130.

As depicted, marketing manager 116 identifies influencer 134 that has influence 140 on potential customer 132 with respect to item 130. As depicted, influencer 134 is a person in people 126 in social network 128. Influencer 134 has a connection to potential customer 132 in this illustrative example.

In this example, influencer 134 has influence 140 on potential customer 132 with respect to item 130. In other words, influencer 134 is able to influence potential customer 132 to purchase item 130.

Influencer 134 is identified using hypergraph 124. As depicted, hypergraph 124 comprises objects 141, edges 150, and influence edges 152. Objects 141 are connected to each other by edges 150, and edges 150 are connected to each other by influence edges 152. In this illustrative example, hypergraph 124 is stored in database 148. In the illustrative example, objects 141 are stored as object nodes 142, edges 150 are stored as edge nodes 144, and influence edges 152 are stored as influence nodes 146 in database 148.

In this illustrative example, object nodes 142 represent objects 141 for people 126 in social network 128. Potential customer 132 is a person in social network 128 and is an object in objects 141 that may be represented as an object node in object nodes 142. Object nodes 142 also may represent other types of objects 141, such as locations, products, services, items 122, skills, activities, positions, or other suitable types of objects 141.

As depicted, edge nodes 144 represent edges 150 connecting objects 141 for people 126 based on relationships between people 126. Edge nodes 144 also may represent edges 150 connecting object nodes 142 for other types of objects other than people 126. For example, items 122 may be objects 141 represented as object nodes 142.

In this illustrative example, influence nodes 146 represent opinion influences 164 between edges 150 that are connected to each other by influence edges 152 in which opinion influences 164 are influences on opinions 162 about items 122. Influence edges 152 represent opinion influences 164. Opinion influences 164 are influences that some of people 126 may have on others of people 126. This type of influence is with respect to items 122. Opinions 162 are opinions that people 126 have on items 122.

Marketing manager 116 generates incentive 156 directed to influencer 134 to influence potential customer 132 to purchase item 130. In other words, incentive 156 is customized to influencer 134. For example, incentive 156 identifies potential customer 132, as well as a reward for influencing potential customer 132 to purchase item 130.

As depicted, marketing manager 116 initiates a display of incentive 156 in application 158 running on client device 160 for influencer 134 on display system 166. Initiation of the display of incentive 156 may be performed in a number of different ways. For example, incentive 156 may be sent directly from marketing manager 116 to application 158. In other illustrative examples, incentive 156 may be sent to websites 108, online social networking service 154, or some other computer system for inclusion in content that is sent to application 158.

In one illustrative example, one or more technical solutions are present that overcome a technical problem with directing advertisements to potential customers that are likely to influence the potential customers to purchase the items. In one illustrative example, incentive 156 may be sent to influencer 134 to influence potential customer 132 to purchase item 130. Influencer 134 has influence 140 on potential customer 132 with respect to an opinion on item 130 that is being marketed to potential customer 132.

As a result, one or more technical solutions may provide a technical effect increasing the effectiveness of marketing item 130 to potential customer 132. The increased effectiveness occurs through identifying influencer 134 that has influence 140 on potential customer 132 with respect to item 130. In this manner, incentive 156 may be generated in a manner that is more effective than merely selecting any of people 126 with connections to potential customer 132 to receive incentive 156 without taking into account whether people 126 have any influence 140 on potential customer 132 with respect to item 130.

Further, the illustrative embodiments also recognize and take into account that a technical issue may be present with respect to storing information about opinion influences 164 in hypergraph 124. In the illustrative example, object nodes 142, edge nodes 144, and influence nodes 146 provide another technical solution to a technical issue of storing influences that some of people 126 have on others of people 126. For example, influencer 134 has influence 140 on potential customer 132 in people 126.

The addition of influence edges 152 stored as influence nodes 146 provides a technical solution to a technical problem with identifying people 126 to influence potential customers to make purchases. This technical solution involves storing opinion influences 164 in hypergraph 124 in database 148 in a manner that allows for identifying which ones of people 126 may be identified as influencer 134 for potential customer 132 with respect to item 130. With this identification, incentive 156 may provide influencer 134 a motivation to influence potential customer 132 to purchase item 130.

As a result, computer system 120 operates as a special purpose computer system in which marketing manager 116 in computer system 120 enables generating incentive 156 for item 130. Incentive 156 is selected for a particular person selected as influencer 134 using information in hypergraph 124. In particular, marketing manager 116 transforms computer system 120 into a special purpose computer system, as compared to currently available general computer systems that do not have marketing manager 116 that uses hypergraph 124.

Computer system 120 with marketing manager 116 performs a transformation of data in hypergraph 124 into incentive 156 that targets the marketing of item 130 to potential customer 132. In this example, the marketing of item 130 may be performed by influencer 134 who is motivated to market item 130 because of incentive 156. In this manner, computer system 120 changes the data in hypergraph 124, showing objects 145 and connections between objects 145, into information that has a different function or a different use, such as customized content for incentive 156 that is directed to influencer 134 to provide motivation to influence potential customer 132 to purchase item 130.

Further, the manner in which information is stored in hypergraph 124 in database 148 when located within computer system 120 also makes computer system 120 a special purpose computer. For example, representing edges 150 as edge nodes 144 provides a technical feature in which connections between edges 150 may be made and stored in a similar fashion in which objects 141 are stored as object nodes 142 in hypergraph 124 in database 148. In a similar fashion, influence edges 152 also may be stored in the form of influence nodes 146.

Figure 3:
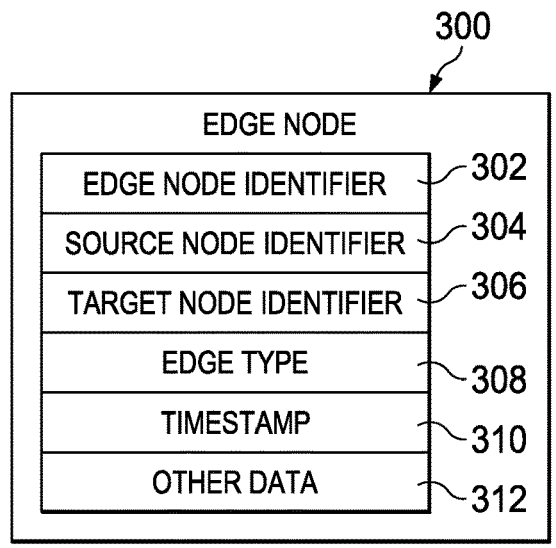
FIG. 3 is a block diagram of an edge node in accordance with an illustrative embodiment.
Figure 4:
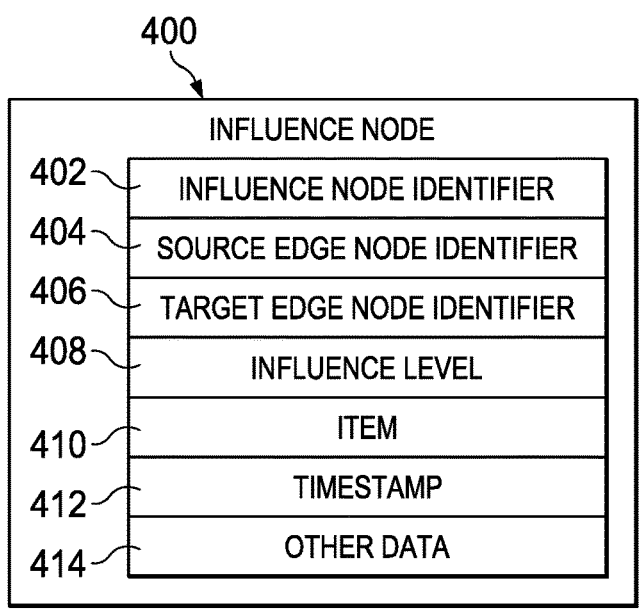
FIG. 4 is a block diagram of an influence node in accordance with an illustrative embodiment.

This type of representation of edges 150 and influence edges 152 provides a technical solution that allows for edges 150 and influence edges 152 and information about edges 150 and influence edges 152 to be stored in database 148. Examples of information that may be stored in edge nodes 144 and influence nodes 146 are shown in FIG. 3 and FIG. 4 below.

In this manner, computer system 138 operates as a special purpose computer in which marketing manager 116 may perform analysis on influences by influencers on potential customers in people 126. This type of analysis is not possible with currently available hypergraphs that do not use the architecture in which edge nodes 144 and influence nodes 146 are used as additional types of nodes in addition to object nodes 142 in hypergraph 124.

In other words, the manner in which information is stored and organized in hypergraph 124 in database 148 enables storing identifications of opinion influences 164 with respect to items 122. One technical solution involves using influence edges 152 to connect a first portion of edges 150 and a second portion of edges 150 to each other in a manner that identifies opinion influences 164.

With these types of data structures, computer system 120 operates as a special purpose computer to provide an ability to identify opinion influences 164 on opinions 162 formed on items 122 in a manner that may be used to identify incentives 114 that are sent to client devices 110 for influencers of potential customers.

Figure 2:
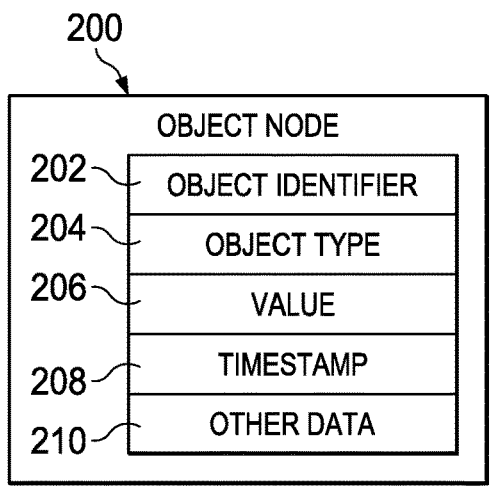
FIG. 2 is a block diagram of an object node in accordance with an illustrative embodiment.

With reference now to FIG. 2, a block diagram of an object node is depicted in accordance with an illustrative embodiment. In the illustrative examples, the same reference numeral may be used in more than one figure. This reuse of a reference numeral in different figures represents the same element in the different figures.

In this illustrative example, object node 200 is an example of an object node in object nodes 142 shown in block form in FIG. 1. Object node 200 has a number of different fields. As depicted, object node 200 includes object identifier 202, object type 204, value 206, timestamp 208, and other data 210.

Object identifier 202 is a value that uniquely identifies object node 200 from other object nodes. The value is unique within a hypergraph.

As depicted, object type 204 identifies the type of object for object node 200. For example, object type 204 may be selected from a group comprising a person, a skill, a location, a position, a team, a department, and some other type of object. In this illustrative example, object type 204 represents individuals in social network 128, such as a person in people 126 and potential customer 132 shown in block form in FIG. 1. Object type 204 may also represent opinions for the individuals.

In this illustrative example, value 206 may be a number, a string, an alphanumeric value, or in some other suitable format. For example, when object type 204 is a person, value 206 may be the name of the person. As another example, when object type 204 is an item, value 206 may be the name of the item. In some illustrative examples, items 122 also may be represented in hypergraph 124 by object nodes 142 shown in block form in FIG. 1.

Timestamp 208 identifies when object node 200 was last changed. Other data 210 may be different for different types of object nodes. For example, other data 210 may include at least one of a level of skill, the amount of time that the skill has been possessed by a person, the specialties for the skill, or other suitable information.

Turning next to FIG. 3, a block diagram of an edge node is depicted in accordance with an illustrative embodiment. In this example, edge node 300 is an example of an edge node in edge nodes 144 shown in block form in FIG. 1. Edge node 300 is a data structure used for storing information about an edge connecting two object nodes. The edge may be a line.

In the illustrative example, edge node 300 includes a number of different fields. Edge node 300 includes edge node identifier 302, source node identifier 304, target node identifier 306, edge type 308, timestamp 310, and other data 312.

Edge node identifier 302 is a value that uniquely identifies edge node 300 from other edge nodes. The value is unique within a hypergraph.

As depicted, source node identifier 304 identifies a first object node, and target node identifier 306 identifies a second object node connected by the edge, as described by edge node 300. A source node is an object node that has a connection to the target node. In other words, the connection may be one that belongs to the source node.

For example, the target node may be a first person that has a connection to a second person, which is the source node. In another example, the source node may be a manager, and the target node is an employee that reports to the manager. In some cases, the designation of a target node and a source node is not needed when a general connection is present between two individuals in a social network.

In the illustrative example, edge type 308 identifies the type of edge that is present. As depicted, edge type 308 may be selected from a group comprising "reports to", "possesses", "located at", "part of", or some other suitable type of edge.

For example, edge node 300 may have a person as a source node and an opinion as a target node with edge type 308 being "possesses" to show that the person possesses an opinion. In another example, the source node is a person, the target node is a building location, and edge type 308 is "located at" to show that the person is located at the building location.

Timestamp 310 identifies when edge node 300 was last changed. Other data 312 is any other data that may be used to describe the edge.

In FIG. 4, a block diagram of an influence node is depicted in accordance with an illustrative embodiment. In this illustrative example, influence node 400 is an example of an influence node in influence nodes 146 shown in block form in FIG. 1. Influence node 400 is a data structure for storing information about an association between two edges. In some illustrative examples, the association may also be referred to as an edge, a connector, or a line that connects two edges to each other.

In the illustrative example, this association represented by influence node 400 is the influence of one edge on another edge, with respect to opinions that a person may have. For example, a first edge is present between a first person and an opinion, and a second edge is present between the first person and a second person. The influence node may be graphically represented by a third edge that connects the first edge and the second edge.

In the illustrative example, influence node 400 has a number of different fields. As depicted, influence node 400 includes influence node identifier 402, source edge node identifier 404, target edge node identifier 406, influence level 408, item 410, timestamp 412, and other data 414.

Influence node identifier 402 is a value that uniquely identifies influence node 400 from other influence nodes. The value of influence node identifier 402 is unique within a hypergraph.

Source edge node identifier 404 identifies a first edge, and target edge node identifier 406 identifies a second edge for which an association between the first edge and the second edge is present. Source edge node identifier 404 identifies a first edge that has an influence on a second edge. The second edge is identified by target edge node identifier 406.

Both edges, the first edge and the second edge, have one object node in common. The object node in common is a person. For example, the first edge identified by source edge node identifier 404 is the person "possesses" an opinion, and the second edge identified by target edge node identifier 406 is the person "connected to" a user.

In this example, influence node 400 identifies an influence of the first edge, which is identified by source edge node identifier 404 on a second edge, which is identified by target edge node identifier 406. Thus, the first edge is a source edge that influences the second edge, which is a target edge. In other words, the first edge influences the second edge.

As depicted, the influence is the influence that a person has on a second person. The second person can be a user that reads reviews made by the person. For example, the user is influenced by the opinion that the person has about an item. For example, when the person has a particular opinion about the item, the user is likely to agree with or adopt that opinion about the item. In this manner, the opinion of the person influences the opinion of the user, which is identified using influence node 400.

Influence level 408 identifies the level of an influence of the first edge, which is identified by source edge node identifier 404 on the second edge, which is identified by target edge node identifier 406. Influence level 408 indicates the likelihood that the user will have the same opinion as the person.

Influence level 408 may be identified in a number of different ways. For example, an operator inputs a value for the likelihood that the user will adopt or agree with the opinion of the person. In one illustrative example, influence level 408 may be identified through surveys or questionnaires. For example, the potential customer may answer a survey that asks about who has influence on the potential customer with respect to different items. In another example, potential influencers also may provide input as to who they have influence on as potential customers.

As another example, a statistical analysis may be made to identify the value of influence level 408. For example, with the person providing opinions on items, analysis may be identified as to how often the user agrees with or "likes" the opinions made by the person. This information may be identified in the social network.

Item 410 identifies one or more items for which the influence on opinions is present. The person may have an influence on the user for one item, but not for another item. For example, the person may have an influence on the user with respect to opinions on automobiles, but may have no influence on opinions regarding lawn services. Further, different items may have different influence levels identified in influence level 408. In other words, influence level 408 may include a value for each item in item 410.

Timestamp 412 identifies when influence node 400 was last changed. Other data 414 may include any other information about the influence.

Figure 5:
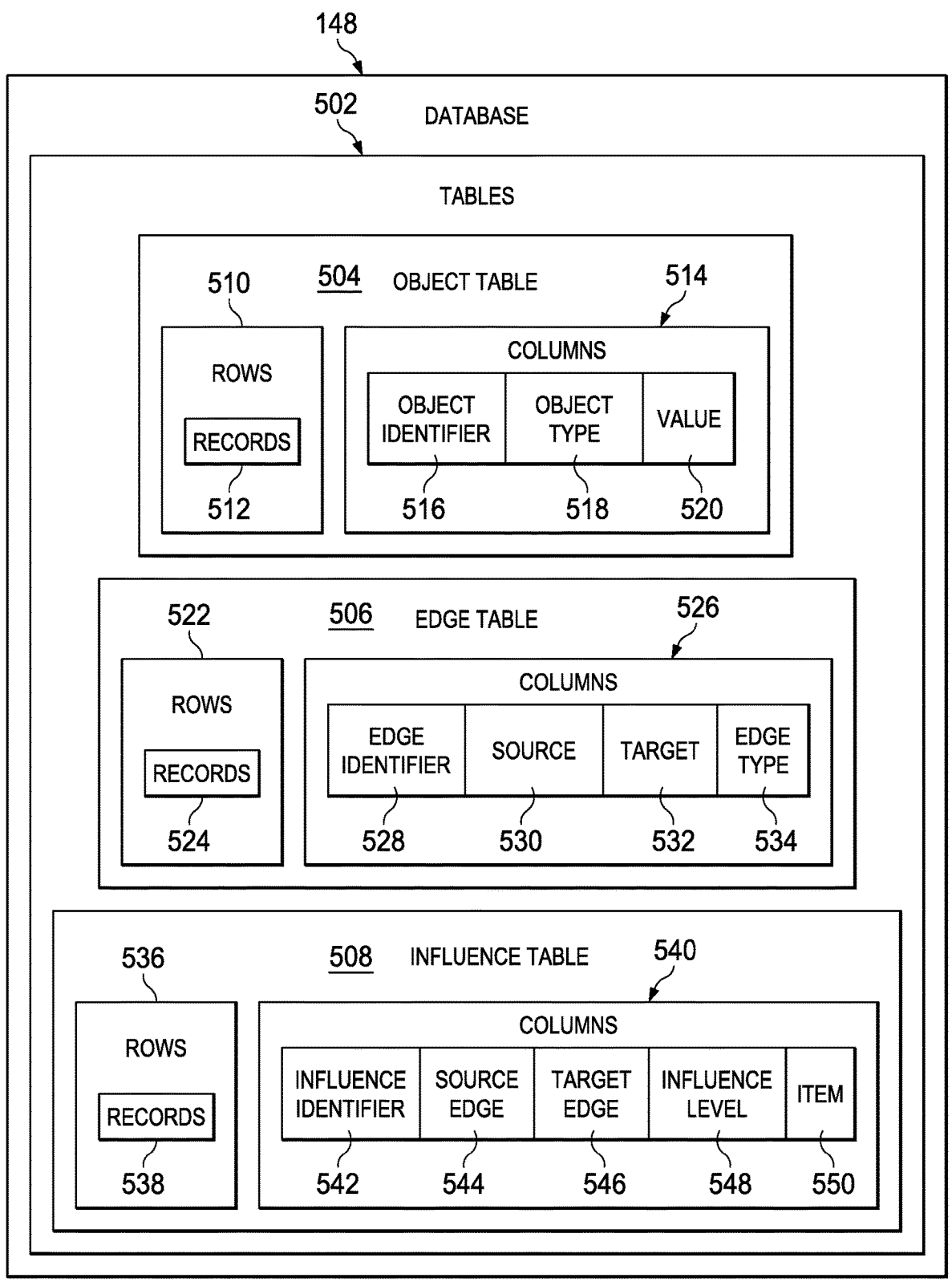
FIG. 5 is a block diagram of a database in accordance with an illustrative embodiment.

With reference now to FIG. 5, a block diagram of a database is depicted in accordance with an illustrative embodiment. An example of one implementation for database 148 is shown. As depicted, database 148 includes tables 502. Tables 502 include object table 504, edge table 506, and influence table 508.

Object table 504 includes rows 510 for records 512. Records 512 store information for object nodes 142 shown in block form in FIG. 1. Each record in records 512 stores information for a single object node, such as object node 200 shown in block form in FIG. 2.

Object table 504 also includes columns 514. Each column in columns 514 represents fields in records 512. As depicted, columns 514 include object identifier 516, object type 518, and value 520.

In this illustrative example, edge table 506 includes rows 522 for records 524. Records 524 store information for edge nodes 144 shown in block form in FIG. 1. Each record in records 524 stores information for a single edge node, such as edge node 300 shown in block form in FIG. 3.

Edge table 506 also includes columns 526. Each column in columns 526 represents fields in records 524. As depicted, columns 526 include edge identifier 528, source 530, target 532, and edge type 534.

In this illustrative example, influence table 508 includes rows 536 for records 538. Records 538 store information for influence nodes 146 shown in block form in FIG. 1. Each record in records 538 stores information for a single influence node, such as influence node 400 shown in block form in FIG. 4.

Influence table 508 also includes columns 540. Each column in columns 540 represents fields in records 538. As depicted, columns 540 include influence identifier 542, source edge 544, target edge 546, influence level 548, and item 550.

Figure 6:
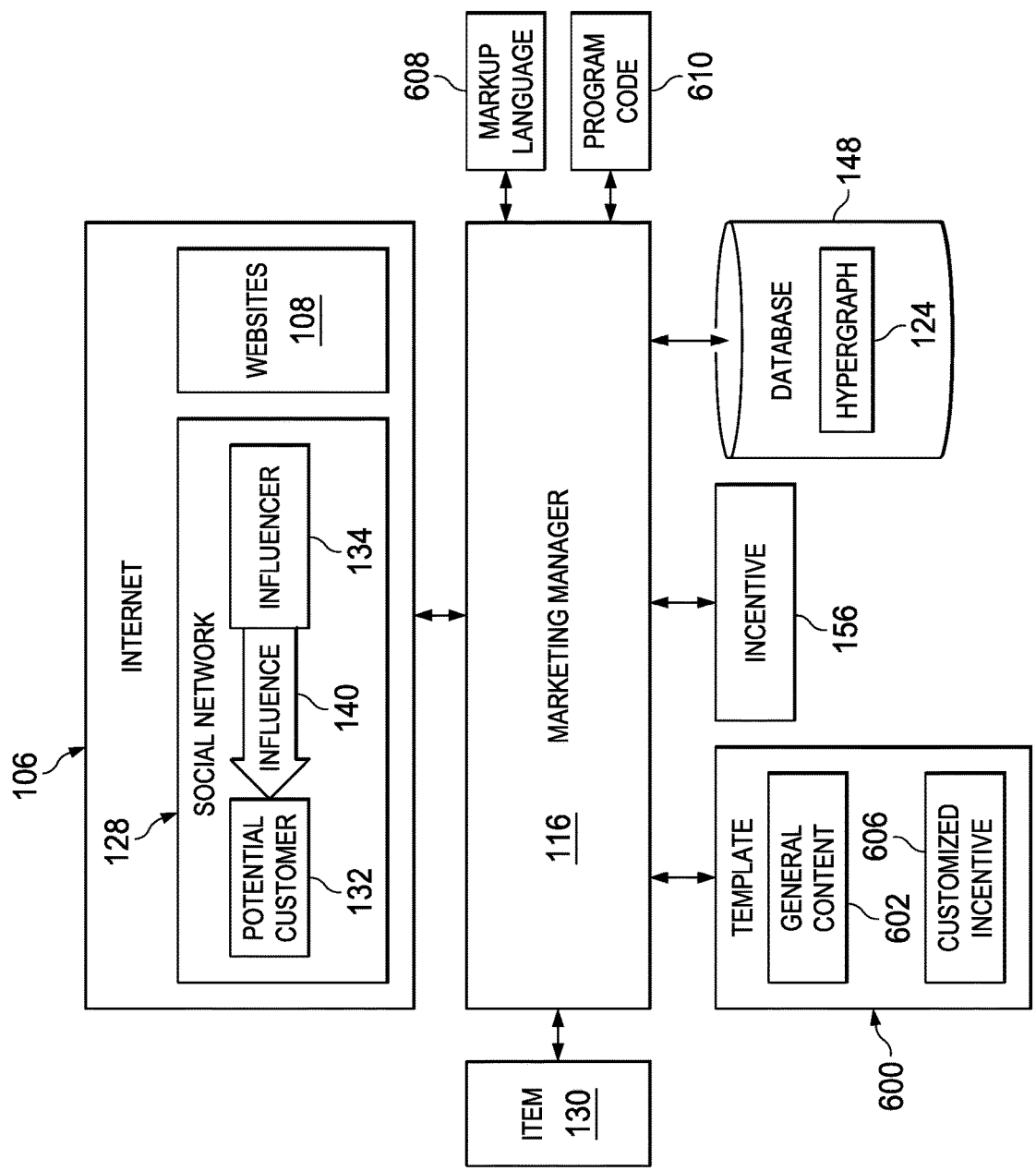
FIG. 6 is a block diagram of dataflow for generating an incentive in accordance with an illustrative embodiment.

With reference next to FIG. 6, a block diagram of dataflow for generating an incentive is depicted in accordance with an illustrative embodiment. In this illustrative example, marketing manager 116 identifies item 130 for targeted marketing. In this illustrative example, targeted marketing means that the marketing of item 130 is directed to one or more people as potential customers for item 130. Additionally, marketing manager 116 identifies potential customer 132 in social network 128 as the target for marketing item 130.

Potential customer 132 may be identified in a number of different ways. For example, potential customer 132 may be identified based on at least one of a hobby, a profession, a net worth, a salary, residence, age, or other suitable characteristics about potential customer 132. Marketing manager 116 identifies influencer 134 in social network 128 who is connected to potential customer 132. Identification of influencer 134 is made using hypergraph 124 in database 148. In this illustrative example, influencer 134 is a person who has influence 140 on potential customer 132. Influence 140 may be a general influence on potential customer 132 or may be specific to item 130. In this illustrative example, the identification is made using hypergraph 124.

With the identification of influencer 134, marketing manager 116 generates incentive 156. Incentive 156 is directed to influencer 134 and is intended to cause influencer 134 to influence potential customer 132 to purchase item 130.

In this illustrative example, incentive 156 may be generated using template 600. Template 600 may be an advertisement containing general content 602 for marketing item 130. General content 602 is not directed to any particular person. General content 602 may include, for example, images, video, audio, text, and other types of content about item 130. General content 602 identifies item 130 and may provide information about item 130.

As depicted, template 600 also includes customized incentive 606. Customized incentive 606 includes at least one of an offering of a rebate, a discount, a gift card, a monetary reward, a prize, merchandise, a travel reward, or some other suitable customized incentive to influence potential customer 132 to purchase item 130.

The selection of customized incentive 606 may be based on information identified for influencer 134. For example, this information may be obtained about preferences regarding rewards from a survey by influencer 134, prior incentives obtained by influencer 134, or other suitable sources. The selection of customized incentive 606 also may be based on the demographics of influencer 134. These demographics may include age, location, profession, and other suitable demographic information about influencer 134. In this manner, customized incentive 606 in template 600 results in the customization of incentive 156 that is directed to influencer 134 to encourage or motivate influencer 134 to influence potential customer 132 to purchase item 130.

Other items in items 122 shown in block form in FIG. 1 may have other templates other than template 600. These other items in items 122 may be targeted to provide incentives to other influencers of potential customer 132 or other potential customers.

Incentive 156 may take a number of different forms. For example, incentive 156 may be selected from one of a banner ad, a frame ad, a pop-up ad, a floating ad, an expanding ad, a news feed item, or some other suitable form of advertisement.

In this illustrative example, marketing manager 116 may generate markup language 608 that includes incentive 156. Markup language 608 may be, for example, hypertext markup language (HTML), extensible markup language (XML), or some other suitable markup language for display on a browser or other application that is able to display a web page.

Markup language 608 may be an entire web page including incentive 156, as well as other content. In another example, markup language 608 may only be incentive 156. Markup language 608 may be placed into a web page.

In another illustrative example, marketing manager 116 may generate program code 610. For example, program code 610 may be a script or other language that may be used to display incentive 156 on a web page, a mobile application, or some other suitable type of application.

After incentive 156 is generated, marketing manager 116 initiates the display of incentive 156 on display system 166, as shown in block form in FIG. 1, for client device 160, as shown in block form in FIG. 1, used by influencer 134. Display system 166 is a physical hardware system and includes one or more display devices. The display devices may include at least one of a light emitting diode (LED) display, a liquid crystal display (LCD), an organic light emitting diode (OLED) display, or some other suitable display device.

Initiation of the display of incentive 156 in display system 166 for client device 160 may be performed in a number of ways. For example, when markup language 608 is a web page, markup language 608 may be sent directly to client device 160. In other illustrative examples, at least one of markup language 608 or program code 610 containing incentive 156 may be sent to a web server that sends incentive 156 to client device 160. In another example, at least one of markup language 608 or program code 610 may be sent to online social networking service 154, as shown in block form in FIG. 1, websites 108, or other locations that may be used to distribute incentives that may be viewed by influencer 134 or other influencers for item 130 or other items that may be marketed to different potential customers.

The illustration of information environment 100 shown in block form in FIG. 1 and the different components in FIGS. 1-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, marketing manager 116 may be included as part of online social networking service 154 shown in block form in FIG. 1. In other lists of examples, marketing manager 116 may be implemented in servers providing websites 108. Further, information environment 100 may include one or more social networks in addition to or in place of social network 128 shown in block form in FIG. 1. As another example, database 148 may be part of computer system 120 shown in block form in FIG. 1 in some illustrative examples.

Figure 7:
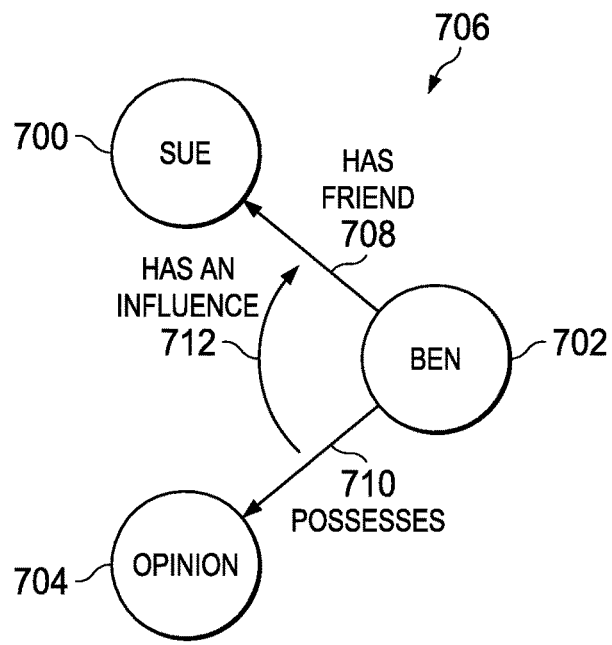
FIG. 7 is an illustration of an influence on an opinion formed by a potential customer in accordance with an illustrative embodiment.

With reference next to FIG. 7, an illustration of an influence on an opinion formed by a potential customer is depicted in accordance with an illustrative embodiment. A portion of a hypergraph is shown to illustrate the influence a first person may have on a second person.

As depicted, Sue 700, Ben 702, and opinion 704 are vertices in hypergraph 706. These vertices may be represented in data structures as object nodes 142 shown in block form in FIG. 1. This portion of hypergraph 706 is an example of one implementation of hypergraph 124 shown in block form in FIG. 1.

Sue 700 and Ben 702 are people. Sue 700 is the potential customer in this example. As depicted, "has friend" 708 is an edge that connects Sue 700 and Ben 702 as friends. In this example, "possesses" 710 is an edge showing that Ben 702 has opinion 704. As depicted, the edges "has friend" 708 and "possesses" 710 may be represented in data structures as edge nodes.

Also in this example, "has an influence" 712 is a line that connects "possesses" 710 to "has friend" 708, which are edges. As depicted, "has an influence" 712 is an association between edges that may be represented in a data structure by an influence node in influence nodes 146 shown in block form in FIG. 1.

In this illustrative example, "has an influence" 712 shows an association between "has friend" 708 and "possesses" 710. Thus, the edge "has an influence" 712 shows that Ben 702 has an influence on Sue 700 with opinion 704 held by Ben 702. In this illustrative example, opinion 704 may be an opinion with respect to a particular item. In other illustrative examples, opinion 704 may be a general influence that Ben 702 has on Sue 700 with respect to any item.

In other words, when Sue 700 obtains opinion 704 by Ben 702, Sue 700 is influenced by opinion 704. In this illustrative example, opinion 704 is one that Ben 702 has on an item. Sue 700 may rely on opinion 704 made by Ben 702 in evaluating an item. Sue 700 may obtain opinion 704 in a number of different ways. For example, Ben 702 may talk to Sue 700 about the item. The reliance may be more as compared to opinions by other people that do not have an influence on Sue 700.

In this illustrative example, Sue 700 may be potential customer 132 shown in block form in FIG. 1. Ben 702 is influencer 134 with respect to item 130 shown in block form in FIG. 1.

The amount of influence that Ben 702 has on Sue 700 may be identified by an influence node, such as influence node 400 shown in block form in FIG. 4. In this example, "has an influence" 712 may include a level of influence, as well as a group of items over which an influence is present for Sue 700 for opinion 704. The influence may be only valid for some items and not for other items.

As depicted, opinion 704 is a general opinion and not necessarily for a specific type of item. The types of items for which an influence is present may be identified by the influence node.

The illustration of the portion of the hypergraph shown in FIG. 7 is not meant to limit the manner in which other illustrative examples maybe implemented. For example, only three object nodes are shown in FIG. 7. The complete hypergraph may include hundreds, thousands, or other numbers of object nodes. Further, other types of object nodes, other than people, also may be present in the hypergraph. For example, the object nodes may also represent skills, locations, or other suitable objects.

Figure 8:
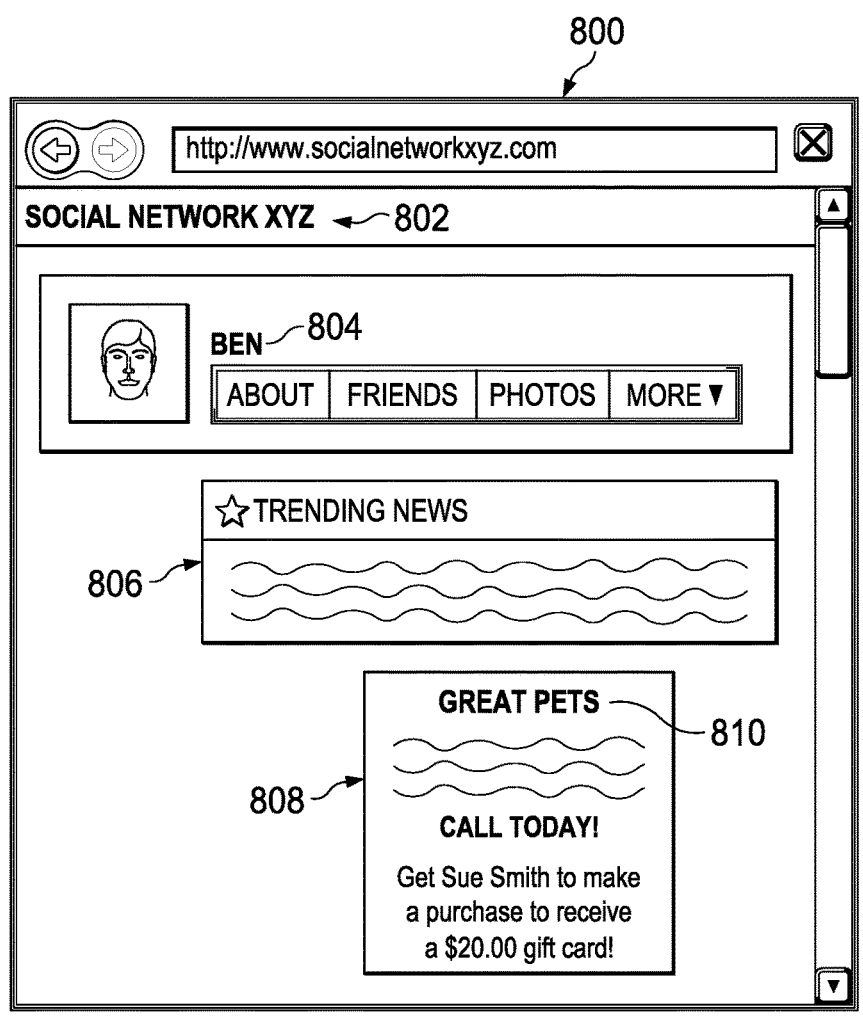
FIG. 8 is an illustration of an incentive in accordance with an illustrative embodiment.

With reference now to FIG. 8, an illustration of an incentive is depicted in accordance with an illustrative embodiment. In this illustrative example, graphical user interface 800 is an example of a graphical user interface that may be displayed on display system 166 for client device 160 shown in block form in FIG. 1.

In this illustrative example, web page 802 is displayed in graphical user interface 800. Web page 802 displays information from a social network for a user, Ben 804, and shows a news feed in section 806. Web page 802 includes incentive 808. In this illustrative example, incentive 808 is generated by a marketing manager, such as marketing manager 116 shown in block form in FIG. 1.

Incentive 808 directed specifically to Ben 804 offers Ben 804 a $20.00 gift card to influence Sue Smith to make a purchase from a pet supply company called "Great Pets" 810. In this example, "Great Pets" 810 has been identified as the item to which targeted marketing directed to Sue Smith. Incentive 808 is generated specifically for Ben 804 and placed into the newsfeed in section 806 for Ben 804 as shown on web page 802. In other words, incentive 808 is customized to provide Ben 804 a motivation to influence Sue Smith with respect to "Great Pets" 810.

In this illustrative example, the selection of Ben 804 to receive incentive 808 is not merely because Ben 804 has a connection to Sue Smith. Ben 804 was selected because Ben 804 had been identified as having an influence on Sue Smith with respect to pet supply companies. In this manner, Ben 804 may take action and cause Sue Smith to make a purchase from "Great Pets" 810.

Figure 9:
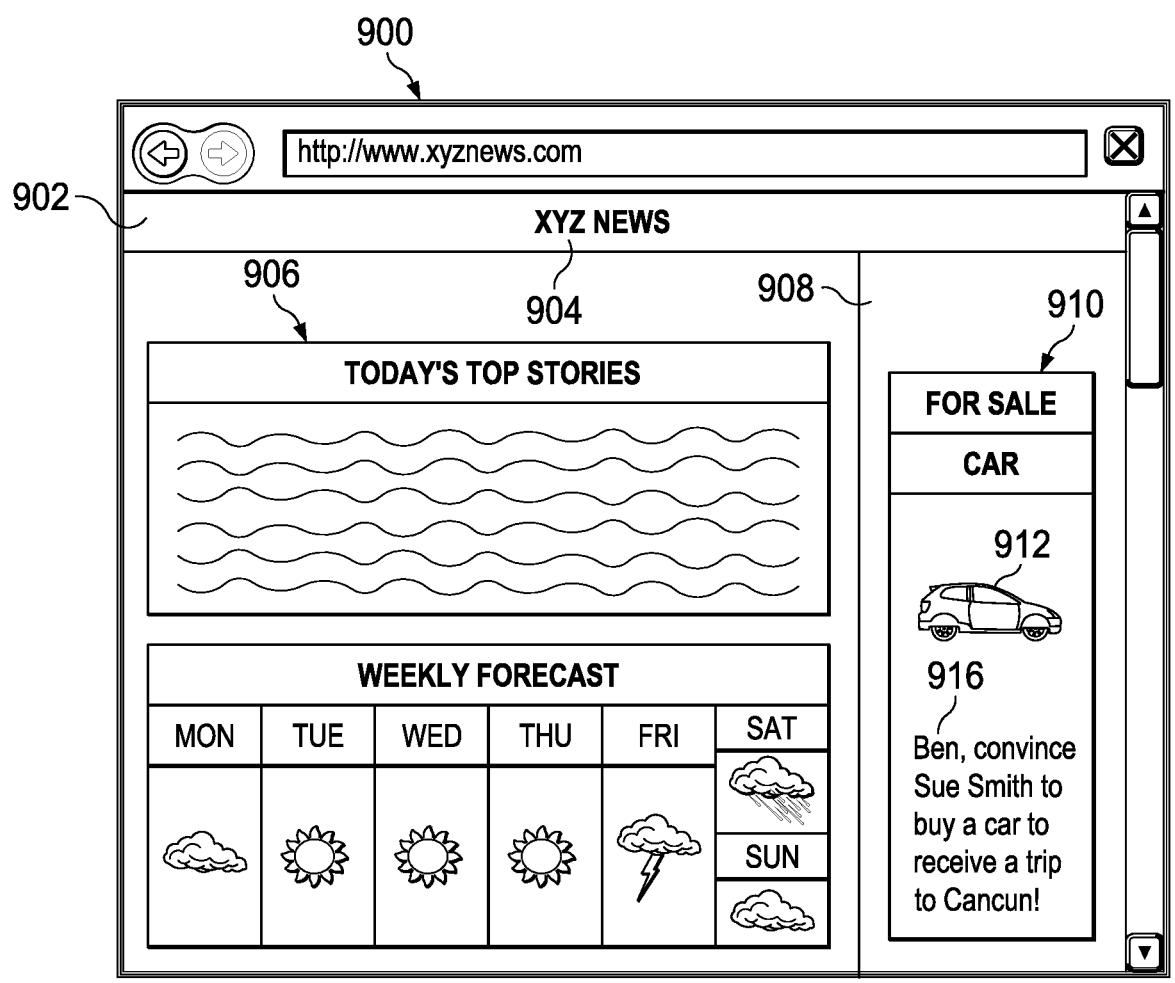
FIG. 9 is an illustration of another incentive in accordance with an illustrative embodiment.

Turning next to FIG. 9, an illustration of another incentive is depicted in accordance with an illustrative embodiment. In this illustrative example, graphical user interface 900 is an example of a graphical user interface that may be displayed on display system 166 for client device 160 shown in block form in FIG. 1.

Web page 902 is a web page from a website for a news organization called "XYZ News" 904. In this illustrative example, section 906 shows a news feed for "XYZ News" 904.

Section 908 includes incentive 910. Incentive 910 is for car 912. More specifically, incentive 910 provides an incentive to Ben 916 to influence Sue Smith to purchase car 912. Incentive 910 offers Ben 916 a trip to Cancun as a reward.

In this illustrative example, incentive 910 is selected specifically to target the user receiving web page 902 with respect to car 912. Ben 916 is selected for incentive 910 displayed because Ben 916 has an influence on the potential customer, Sue Smith, on opinions with respect to cars.

Figure 10:
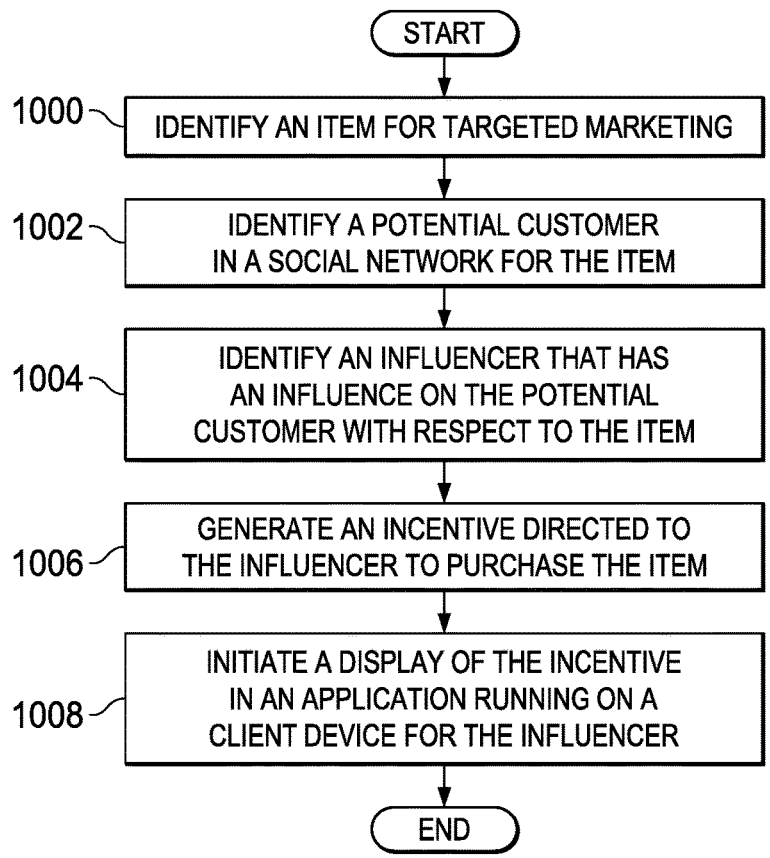
FIG. 10 is a flowchart of a process for influencing a potential customer to purchase an item in accordance with an illustrative embodiment.

Turning next to FIG. 10, a flowchart of a process for influencing a potential customer to purchase an item is depicted in accordance with an illustrative embodiment. The process illustrated in FIG. 10 may be implemented in information environment 100 shown in block form in FIG. 1. For example, the process may be implemented in marketing manager 116 shown in block form in FIG. 1.

The process begins by identifying an item for targeted marketing (step 1000). The process then identifies a potential customer in a social network for the item (step 1002).

Next, the process identifies an influencer that has an influence on the potential customer with respect to the item (step 1004). For example, the influencer may be identified from the hypergraph as a person with an influence on an opinion of the potential customer with respect to the item. In other words, the influencer may be able to cause the potential customer to have an opinion that is favorable to the item such that the customer will purchase the item.

The process then generates an incentive directed to the influencer to purchase the item (step 1006). Afterwards, the process initiates a display of the incentive in an application running on a client device for the influencer (step 1008) with the process terminating thereafter.

Figure 11:
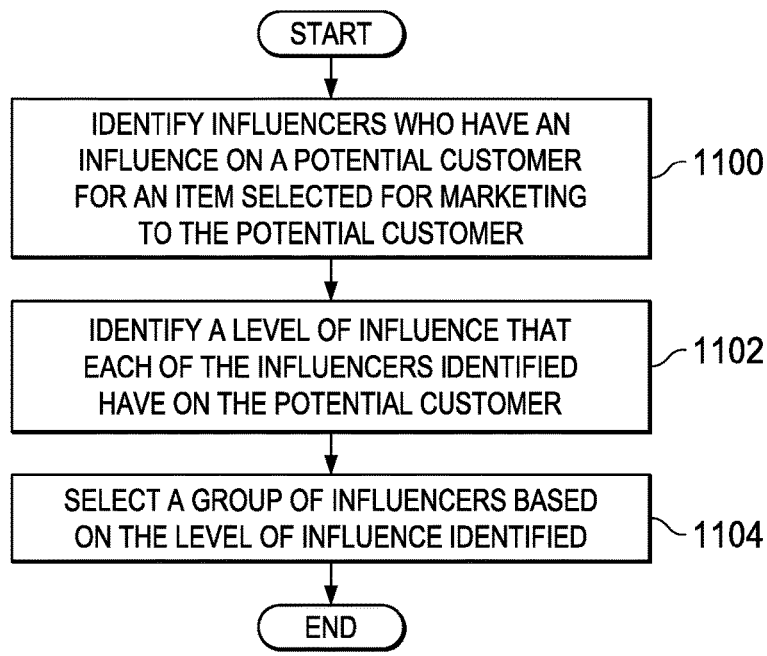
FIG. 11 is a flowchart of a process for identifying a group of influencers for use in marketing an item to a potential customer in accordance with an illustrative embodiment.

With reference next to FIG. 11, a flowchart of a process for identifying a group of influencers for use in marketing an item to a potential customer is depicted in accordance with an illustrative embodiment. This process may be implemented when more than one influencer is selected to receive an incentive to influence the potential customer to purchase the item.

The process begins by identifying influencers who have an influence on a potential customer for an item selected for marketing to the potential customer (step 1100). The process then identifies a level of influence that each of the influencers identified have on the potential customer (step 1102). In this illustrative example, the level of influence may be stored in an influence note such as influence node 400 shown in block form in FIG. 4.

The process then selects a group of influencers based on the level of influence identified (step 1104). The particular influencers in the group of influencers may be selected in a number of different ways. Influencers having a level of influence over a selected threshold may be used. In other illustrative examples, the influencers may be ranked and a number of influencers may be selected using the ranking to form the group of influencers. For example, the top two influencers, the top four influencers, or some other number of influencers may be selected. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process in FIG. 10 may be performed to identify more than one influencer. The process in FIG. 10 may also identify a number of influencers that have an influence on the potential customer with respect to the item.

A group of influencers is formed from the influencer identified in step 1004 and the number of influencers that are also identified. The group of influencers may be some or all of the influencers that have been identified. The group of influencers is identified based on a level of influence that the influencer and the number of influencers have on the potential customer. In other words, the identification of influencers may be based on a level of influence that each influencer has on the potential customer with respect to the item.

A group of incentives may be generated and directed to the group of influencers to influence the potential customer to purchase the item. The incentives may all be the same or they may be tailored to each of the influencers identified. The process initiates the display of the group of incentives in a group of applications running on a group of client devices for the group of influencers.

Figure 12:
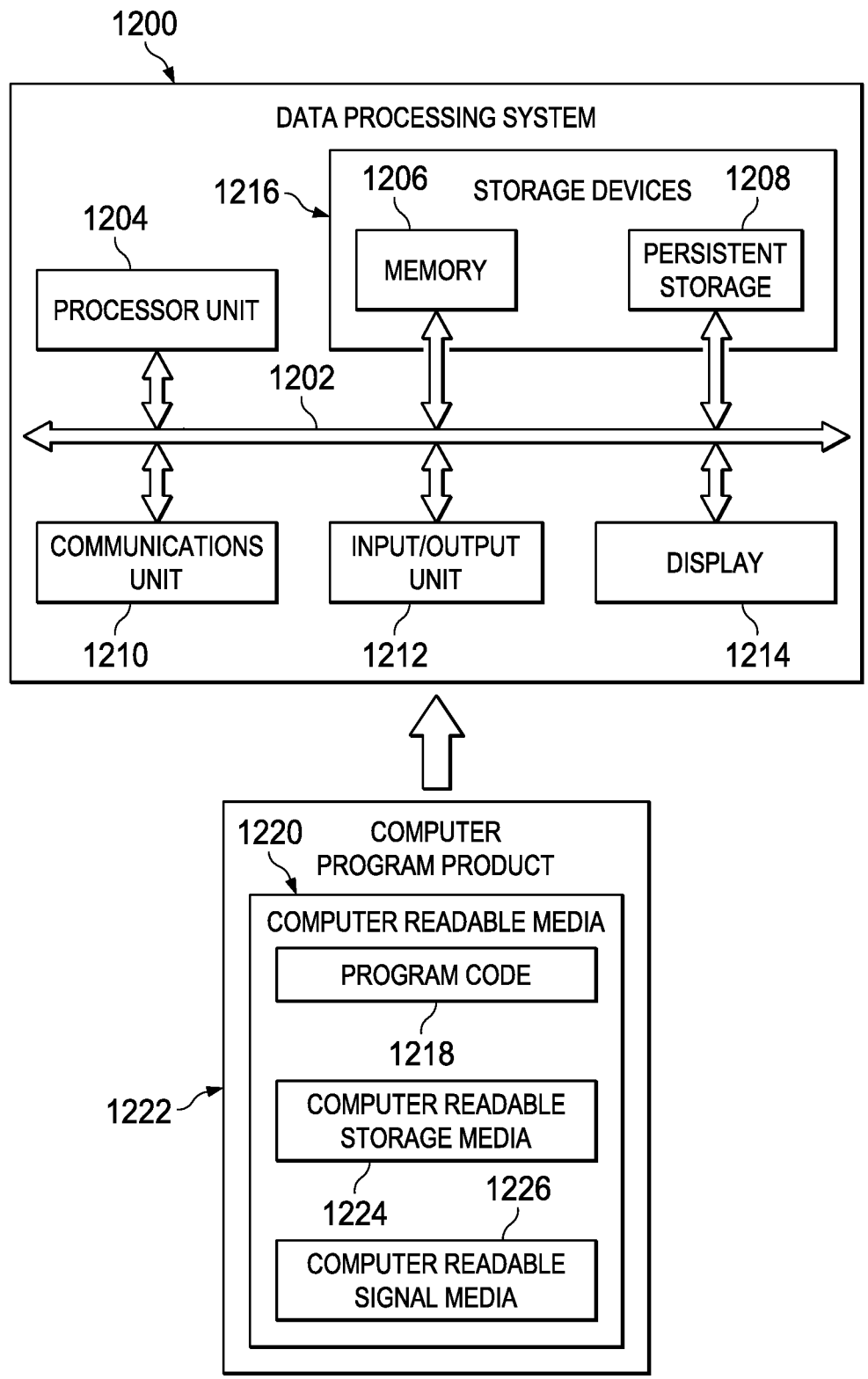
FIG. 12 is a block diagram of a data processing system in accordance with an illustrative embodiment.

Turning now to FIG. 12, a block diagram of a data processing system is depicted in accordance with an illustrative embodiment. Data processing system 1200 may be used to implement client devices 110, online social networking service 154, and computer system 120 shown in block form in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these illustrative examples. In one example, computer readable media 1220 may be computer readable storage media 1224 or computer readable signal media 1226. In these illustrative examples, computer readable storage media 1224 is a physical or tangible storage device used to store program code 1218 rather than a medium that propagates or transmits program code 1218.

Alternatively, program code 1218 may be transferred to data processing system 1200 using computer readable signal media 1226. Computer readable signal media 1226 may be, for example, a propagated data signal containing program code 1218. For example, computer readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Thus, one or more technical solutions are present that overcome a technical problem with directing incentives to influencers in a manner that is likely to motivate or cause the influencers to influence the potential customers to purchase the items directed to the potential customers. In one illustrative example, an incentive may be sent to an influencer having a connection to the potential customer in which the influencer has influence on the potential customer with respect to an opinion on the item that is being marketed to the potential customer. In this manner, the influencer may function as a marker for the company offering the item.

One or more technical solutions may provide a technical effect increasing the effectiveness of incentives that are customized for influencers. The increased effectiveness occurs through identifying the people that have an influence on the potential customer with respect to the item that is being marketed to the potential customer. In this manner, the incentive may be generated in a manner that is more effective than merely selecting people to receive incentives who have connections to the potential customer without taking into account whether any of the people selected have any influence on the potential customer with respect to the item.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for influencing a potential customer to purchase an item, the method comprising:
  identifying, by a computer system, the item for targeted marketing;
  identifying, by the computer system, the potential customer in a social network for the item;
  creating a hypergraph, wherein the hypergraph comprises:
    a first set of objects representing people in a social network, wherein the potential customer and an influencer are people in the social network;
    a second set of objects representing opinions about items;

a set of first edge types that connect source objects in the first set of objects to target objects in the second set of objects,
  wherein an edge from the set of first edge types represents an opinion expressed by the influencer in the social network about a specified item;
  a set of second edge types that connect the source objects to target objects in the first set of objects, wherein an edge from the set of second edge types represents a relationship between the potential customer in the social network and the influencer s in the social network; and
  a set of influence edges that connect the first edge type to the second edge type, wherein an influence edge represents an influence level that the influencer has on the potential customer that indicates a likelihood that the potential customer will be influenced by the opinion of the influencer, wherein an influence level is dependent on the item; and
identifying, by the computer system using the hypergraph, influencers that each have an influence on the potential customer;
determining, by the computer system, an influence level for each influencer, wherein the influence level of an influencer is determined according to a statistical analysis regarding how often the potential customer agrees with or likes opinions made by the influencer;
ranking, by the computer system, the influencers according to influence level;
selecting from the influencers, by the computer system, a group of influencers, wherein the selected group of influencers comprises a specified number of top ranked influencers;
generating, by the computer system, an incentive directed to each influencer from the selected group of influencers to influence the potential customer to purchase the item; and
initiating, by the computer system, a display of the incentive in an application running on a client device for each influencer.

2. The method of claim 1, wherein the objects for the people are stored as object nodes in a database in the computer system, the edges are stored as edge nodes in the database in the computer system, and the influence edges are stored as influence nodes in the database in the computer system.

3. The method of claim 1, wherein initiating, by the computer system, the display of the incentive in the application further comprises:
  sending, by the computer system, the incentive to a web server, wherein the web server includes the incentive in content that is sent to the application.

4. The method of claim 1, wherein initiating, by the computer system, the display of the incentive in the application further comprises:
  sending, by the computer system, the incentive to the social network that generates content containing the incentive and sends the content to the application.

5. The method of claim 1, wherein the application is a social media application and is selected from a browser and a mobile application.

6. The method of claim 1, wherein the incentive is located in one of a banner ad, a frame ad, a pop-up ad, a floating ad, an expanding ad, and a news feed ad.

7. The method of claim 1, wherein the item is selected from one of a product, a service, an entity, a person, an organization, a company, a partnership, a charity, an educational group, a social group, a team, a city, a government agency, a theme park, and a restaurant.

8. The method of claim 1, wherein the group of influencers is identified based on a level of influence that the influencer and the number of influencers have on the potential customer.

9. A computer program product for managing advertisements, the computer program product comprising:
  a computer readable storage media, wherein the computer readable storage media comprises a physical or tangible storage device used to store program code;
  first program code, stored on the computer readable storage media, for identifying an item for targeted marketing;
  second program code, stored on the computer readable storage media, for identifying a potential customer in a social network for the item;
  third program code, stored on the computer readable storage media, for creating a hypergraph, wherein the hypergraph comprises:
    a first set of objects representing people in a social network, wherein the potential customer and an influencer are people in the social network; a second set of objects representing opinions about items;
    a set of first edge types that connect source objects in the first set of objects to target objects in the second set of objects, wherein an edge from the set of first edge types represents an opinion expressed by the influencer in the social network about a specified item;
    a set of second edge types that connect the source objects to target objects in the first set of objects, wherein an edge from the set of second edge types represents a relationship between the influencer in the social network and the potential customer in the social network; and
    a set of influence edges that connect the first edge type to the second edge type, wherein an influence edge represents an influence level that the influencer has on the potential customer that indicates the likelihood that the potential customer will be influenced by the opinion of the influencer, wherein an influence level is dependent on type of item; and
  fourth program code, stored on the computer readable storage media, for identifying, using the hypergraph, a number of influencers that each have an influence on the potential customer;
  fifth program code, stored on the computer readable storage media, for determining an influence level for each influencer, wherein the influence level of an influencer is determined according to a statistical analysis regarding how often the potential customer agrees with or likes opinions made by the influencer;
  sixth program code, stored on the computer readable storage media, for ranking the influencers according to influence level;
  seventh program code, stored on the computer readable storage media, for selecting from the influencers, a group of influencers, wherein the selected group of influencers comprises a specified number of top ranked influencers;
  eighth program code, stored on the computer readable storage media, for generating an incentive directed to each influencer from the selected group of influencers to influence the potential customer to purchase the item; and ninth program code, stored on the computer readable storage media, for initiating a display of the incentive in an application running on a client device for the influencer.

10. The computer program product of claim 9, wherein the ninth program code comprises:
program code, stored on the computer readable storage media, for sending the incentive to a web server, wherein the web server includes the incentive in content that is sent to the application.

11. The computer program product of claim 9, wherein the ninth program code comprises:
program code, stored on the computer readable storage media, for sending the incentive to the social network that generates content containing the incentive and sends the content to the application.

12. The computer program product of claim 9, wherein the application is a social media application and is selected from a browser and a mobile application.

13. The computer program product of claim 9, wherein an advertisement is located in one of a banner ad, a frame ad, a pop-up ad, a floating ad, an expanding ad, and a news feed ad.

14. The computer program product of claim 9, wherein the item is selected from one of a product, a service, an entity, a person, an organization, a company, a partnership, a charity, an educational group, a social group, a team, a city, a government agency, a theme park, and a restaurant.

15. A system comprising:
a bus system;
a storage device connected to the bus system, wherein the storage device stores program instructions; and
a number of processors connected to the bus system, wherein the number of processors execute the program instructions to:
identify an item for targeted marketing;
identify a potential customer in a social network for the item;
create a hypergraph comprising:
a first set of objects representing people in a social network, wherein the potential customer and an influencer are people in the social network;
a second set of objects representing opinions about items;
a set of first edge types that connect source objects in the first set of objects to target objects in the second set of objects, wherein an edge from the set of first edge types represents an opinion expressed by the influencer in the social network about a specified item;
a set of second edge types that connect the source objects to target objects in the first set of objects, wherein an edge from the set of second edge types represents a relationship between the influencer in the social network and the potential customer in the social network; and
a set of influence edges that connect the first edge type to the second edge type, wherein an influence edge represents an influence level that the influencer has on the potential customer that indicates a likelihood that the potential customer will be influenced by the opinion of the influencer, and, wherein an influence level is dependent on type of item;
identify influencers, using the hypergraph, that each have an influence on the potential customer;
determine an influence level for each influencer, wherein the influence level of an influencer is determined according to a statistical analysis regarding how often the potential customer agrees with or likes opinions made by the influencer;
rank the influencers according to influence level;
select from the number of influencers, a group of influencers, wherein the selected group of influencers comprises a specified number of top ranked influencers;
generate an incentive for each influencer from the selected group of influencers to influence the potential customer to purchase the item; and
initiate a display of the incentive in an application running on a client device for each influencer.

16. The system of claim 15, wherein the objects for the people are stored as object nodes in a database in a computer system, the edges are stored as edge nodes in the database in the computer system, and the influence edges are stored as influence nodes in the database in the computer system.

17. The system of claim 15, wherein initiating the display of the incentive in the application further comprises sending the incentive to a web server, wherein the web server includes the incentive in content that is sent to the application.

18. The system of claim 15, wherein initiating the display of the incentive in the application further comprises sending the incentive to the social network that generates content containing the incentive and sends the content to the application.

19. The system of claim 15, wherein the application is a social media application and is selected from a browser and a mobile application.

20. The system of claim 15, wherein the incentive is located in one of a banner ad, a frame ad, a pop-up ad, a floating ad, an expanding ad, and a news feed item.

21. The system of claim 15, wherein the item is selected from one of a product, a service, an entity, a person, an organization, a company, a partnership, a charity, an educational group, a social group, a team, a city, a government agency, a theme park, and a restaurant.

* * * * *